United States Patent
Yamato et al.

(10) Patent No.: US 6,811,925 B2
(45) Date of Patent: Nov. 2, 2004

(54) NONAQUEOUS ELECTROLYTE SECONDARY CELL AND A TUNGSTEN OR MOLYBDENUM SUBSTITUTED LITHIUM POSITIVE ELECTRODE ACTIVE MATERIAL

(75) Inventors: Koji Yamato, Niigata (JP); Koji Hayashi, Niigata (JP); Hajime Kitamura, Nagano (JP); Takahiro Miyashita, Niigata (JP); Yoshinori Naruoka, Muko (JP); Junichi Toriyama, Kyoto (JP); Masanao Terasaki, Muko (JP)

(73) Assignees: Chuo Denki Kogyo Co., Ltd., Niigata (JP); Japan Storage Battery Co., Ltd., Kyoto (JP)

( * ) Notice: Subject to any disclaimer, the term of this patent is extended or adjusted under 35 U.S.C. 154(b) by 76 days.

(21) Appl. No.: 10/181,662

(22) PCT Filed: Nov. 19, 2001

(86) PCT No.: PCT/JP01/10081

§ 371 (c)(1),
(2), (4) Date: Nov. 12, 2002

(87) PCT Pub. No.: WO02/41419

PCT Pub. Date: May 23, 2002

(65) Prior Publication Data

US 2003/0129495 A1 Jul. 10, 2003

(30) Foreign Application Priority Data

Nov. 20, 2000 (JP) .......................... 2000-352126

(51) Int. Cl.$^7$ .......................... H01M 4/48; G01G 51/00
(52) U.S. Cl. .......................... 429/231.3; 429/231.5; 429/231.95; 429/223; 423/277; 423/594; 252/519.1; 252/519.4
(58) Field of Search .................. 429/223, 231.5, 429/231.3, 231.95; 423/277, 594; 252/519.1, 519.4

(56) References Cited

U.S. PATENT DOCUMENTS 5,053,297 A   10/1991   Yamahira et al.
5,718,989 A   2/1998    Aoki et al.

(List continued on next page.)

FOREIGN PATENT DOCUMENTS

JP   A 06-283174   7/1994
JP   08-213015     8/1996

(List continued on next page.)

OTHER PUBLICATIONS

A. Rougier et al. *Effect of Cobalt Substitution on Cationic Distribution in $LiNi_{1-y}Co_yO_2$ Electrode Materials*; Mar. 15, 1996; 8 pages.

(List continued on next page.)

*Primary Examiner*—Mark Ruthkosky
(74) *Attorney, Agent, or Firm*—Webb Ziesenheim Logsdon Orkin & Hanson, P.C.

(57) ABSTRACT

A positive active material for nonaqueous electrolyte secondary batteries which has a higher capacity and improved thermal stability in a charged state and is less expensive compared to the current active material of $LiCoO_2$ is provided by a lithium compound oxide having the formula:

$$Li_aNi_bCo_cMn_dM_eO_2 \qquad (1)$$

where M stands for one or two of W and Mo, $0.90 \leq a \leq 1.15$, $0 < b < 0.99$, $0 < c \leq 0.5$, $0 < d \leq 0.5$, $0 < c+d \leq 0.9$, $0.01 \leq e \leq 0.1$, and $b+c+d+e=1$, the lithium compound oxide giving an X-ray diffraction pattern including a diffraction peak or peaks assigned to a compound oxide of Li and W and/or a compound oxide of Li and Mo, in addition to main diffraction peaks assigned to a hexagonal crystal structure.

10 Claims, 8 Drawing Sheets

U.S. PATENT DOCUMENTS

| | | | | |
|---|---|---|---|---|
| 5,783,333 A | * | 7/1998 | Mayer | 429/223 |
| 5,795,558 A | | 8/1998 | Aoki et al. | |
| 6,241,959 B1 | * | 6/2001 | Cho et al. | 423/594.4 |
| 6,346,348 B1 | * | 2/2002 | Nakajima et al. | 429/231.5 |
| 6,383,684 B1 | * | 5/2002 | Yoshimura et al. | 429/231.1 |
| 6,391,496 B1 | * | 5/2002 | Nakajima et al. | 429/231.5 |

FOREIGN PATENT DOCUMENTS

| | | | | |
|---|---|---|---|---|
| JP | 09-171824 | | 6/1997 | |
| JP | 10-199525 | * | 7/1998 | H01M/4/48 |
| JP | 10-289731 | | 10/1998 | |
| JP | 10-321228 | | 12/1998 | |
| JP | 11-307094 | | 11/1999 | |
| JP | 2000-353526 | | 12/2000 | |
| JP | 2001-68113 | | 3/2001 | |
| JP | 2001-266871 | | 9/2001 | |
| JP | 2001-297765 | | 10/2001 | |

OTHER PUBLICATIONS

Kyoko Honbo; *Thermal Stability of LiNi1–x–yCoxMnyO2 as Positive Electrode Materials*; 2 pages; country where published—Japan.

* cited by examiner

(a) positive electrode
(b) negative electrode
(c) electrolytic solution
(d) separator
(e) test cell

NONAQUEOUS ELECTROLYTE SECONDARY CELL AND A TUNGSTEN OR MOLYBDENUM SUBSTITUTED LITHIUM POSITIVE ELECTRODE ACTIVE MATERIAL

TECHNICAL FIELD

The present invention relates to a positive active material for nonaqueous electrolyte secondary batteries useful as a power source in portable electronic or communications equipment, electric cars, and the like, and to a nonaqueous electrolyte secondary battery using the positive active material.

BACKGROUND ART

Lithium ion secondary batteries, which are one class of nonaqueous electrode secondary batteries, have advantages including a high voltage, a high energy density, and a low self discharge, and they have become indispensable as a power source for portable electronic or communications equipment such as mobile phones, laptop personal computers, camcorders, and the like.

Lithium ion secondary batteries which are currently in practical use are 4V-grade batteries in which a carbon material such as graphite is used for the negative electrode, $LiCoO_2$ (lithium cobaltate) is used as an active material for the positive electrode, and a nonaqueous solution of a lithium salt in an organic solvent is used as the electrolytic solution. When these batteries are charged, the following reaction occurs:

Charge reaction: $LiCoO_2 + nC_6 \rightarrow Li_{(1-n)}CoO_2 + nLiC_6$.

A high voltage of at least 4.8 V is required for full (100%) charge of the batteries. However, such a high voltage may cause decomposition of the electrolytic solution and adversely affect the reversibility of charge and discharge reactions, resulting in a loss of the cycle life of the secondary batteries. Therefore, in practice, the maximum voltage is limited to 4.1–4.2 V. Thus, the positive active material is utilized in a stable region where the value of "n" in the above reaction is around 0.5, so the positive active material as charged can be expressed approximately as $Li_{0.5}CoO_2$.

As the performance of portable electronic or communications equipment is increased, it is increasingly required for secondary batteries to have a high energy density with a small size and a light weight. On the other hand, in the field of large-sized secondary batteries for use in electric cars which are under development with a view of maintaining the global environment, there is a demand for secondary batteries which not only have a high energy density but also are safe.

In addition, the costs of secondary batteries are important, particularly for large-sized secondary batteries. The use of an expensive cobalt compound whose resources are limited as a positive active material necessarily adds to the cost of the above-described practical lithium ion secondary batteries. The high cost of lithium ion secondary batteries is a major cause when they are precluded from being mounted in electric cars.

It is well known that $LiNiO_2$ (lithium nickelate) can also be used as a positive active material for lithium ion secondary batteries. Like $LiCoO_2$, $LiNiO_2$ has a layered, hexagonal crystal structure and allows lithium (Li) ions to be intercalated and deintercalated between layers of the crystal structure. The charge reaction occurring when $LiNiO_2$ is used as a positive active material is basically the same as the above-described charge reaction for $LiCoO_2$. However, $LiNiO_2$ can be charged in a stable manner until the value of "n" in the above charge reaction formula reaches around 0.7. Thus, in this case, the positive active material as charged can be expressed approximately as $Li_{0.3}NiO_2$, thereby constituting a positive electrode of a higher capacity.

Compared to $LiCoO_2$, $LiNiO_2$ has the advantages of being less expensive and being capable of making a secondary battery of higher capacity. However, $LiNiO_2$ has the problem that its crystal structure tends to be broken during charging and discharging, thereby adversely affecting the cycle properties of the secondary battery. In addition, in a secondary battery having a positive active material of $LiNiO_2$, an exothermic decomposition reaction may occur when the charged positive active material is exposed to a high temperature in the presence of the electrolytic solution, whereby the active material is converted into a compound approximately expressed as $Li_2Ni_8O_{10}$ and oxygen is liberated. The liberated, active oxygen may react with the electrolytic solution or another component, or serve as combustion-promoting oxygen. As a result, there may be a risk of igniting the battery itself in some cases. Thus, a secondary battery using $LiNiO_2$ as a positive active material has poor thermal stability, and this positive active material could not be used in practical batteries.

As an attempt to improve the cycle properties of a secondary battery using $LiNiO_2$ as a positive active material, stabilizing the crystal structure of this compound by replacing part of Ni by another element such as Co was investigated, as described in Solid State Ionics, 90, 83 (1996). This approach makes it possible to considerably improve the cycle properties.

On the other hand, with respect to the thermal stability of a secondary battery using $LiNiO_2$ as a positive active material, it was reported in the 40th Symposium on Batteries in Japan (1999), Presentation Number 1C12 that when part of Ni is replaced by Co+Mn, the thermal stability can be improved as the amount of replacing Co increases or the Ni content decreases with a certain amount of replacing Mn. With this approach, however, it is difficult to improve the thermal stability to the same level as that of $LiCoO_2$, although an initial capacity surpassing that of $LiCoO_2$ can be obtained.

A $LiCoO_2$-based positive active material containing at least one element selected from Cu, Zn, Nb, Mo, and W is described in JP-A 06-283174. Although it is explained therein that the positive active material has a high capacity and good cycle properties, the cycle properties are measured with only ten cycles and do not yet reach a level sufficient for practical use.

As discussed above, with $LiNiO_2$-based materials which are positive active materials less expensive than $LiCoO_2$, although it is possible to attain a high capacity surpassing that attainable with $LiCoO_2$, the thermal stability of the positive active materials in their charged state is poor, and it is difficult to improve the thermal stability to the same level as that of $LiCoO_2$. Thus, none of these materials have been improved in both initial capacity and thermal stability.

DISCLOSURE OF THE INVENTION

It is an object of the present invention to develop a $LiNiO_2$-based positive active material for use in nonaqueous electrolyte secondary batteries which has an initial capacity higher than that of $LiCoO_2$ and which is improved in thermal stability in a charged state at least to the same level as $LiCoO_2$, thereby making it possible to provide nonaqueous electrolyte secondary batteries which are less expensive and have better performance than the current practical lithium ion secondary batteries.

The present inventors found that the thermal stability of a LiNiO$_2$-based positive active material can be improved at least to the same level as that of LiCoO$_2$ by replacing part of the Ni in LiNiO$_2$ by Co and Mn and further by one or both of W and Mo. Although the invention is not intended to be bound by a specific theory, it is presumed that the improvement in thermal stability results from suppression of oxygen liberation which is caused by decomposition of the positive active material during charging and also from shifting the decomposition temperature to a higher temperature.

The present invention is a positive active material for use in nonaqueous electrolyte secondary batteries, characterized in that it is comprised of a lithium compound oxide (compound oxide of lithium) of the formula:

$$Li_aNi_bCo_cMn_dM_eO_2 \qquad (1)$$

where M stands for one or two of W and Mo, $0.90 \leq a \leq 1.15$, $0 < b < 0.99$, $0 < c \leq 0.5$, $0 < d \leq 0.5$, $0 < c+d \leq 0.9$, $0.01 \leq e \leq 0.1$, and $b+c+d+e=1$, and in that the lithium compound oxide gives an X-ray diffraction pattern including a diffraction peak or peaks assigned to a compound oxide of Li and W and/or a compound oxide of Li and Mo, in addition to main diffraction peaks assigned to a hexagonal crystal structure.

The present invention also relates to a nonaqueous electrolyte secondary battery comprising a negative electrode comprised of lithium metal or a substance capable of absorbing and desorbing Li or Li ions and a positive electrode comprised of the above-described positive active material.

The positive active material for nonaqueous electrolyte secondary batteries having a composition shown by the above formula (1) according to the present invention has significantly improved thermal stability in a charged state. As can be seen from the DSC (differential scanning calorimeter) diagrams given in the examples described below, the improved thermal stability is not only superior to that of LiNiO$_2$, but is also superior to that of conventional thermally-stabilized LiNiO$_2$-based positive active materials in which part of Ni is replaced by Co and Mn, and is even superior to that of LiCoO$_2$ which is inherently thermally stable. Thus, addition of an extremely small amount of W and/or Mo provides a significant improvement in thermal stability without a significant decrease in initial capacity. The effect of W and/or Mo on improvement in thermal stability is not known and has been first found by the present inventors. As a result, the present invention makes it possible to manufacture nonaqueous electrolyte secondary batteries having both good thermal stability and good initial capacity.

DESCRIPTION OF EMBODIMENTS OF THE INVENTION

The positive active material for nonaqueous secondary batteries according to the present invention has a composition as shown in the above formula (1).

In compositional formula (1), the molar ratio of Li, "a", is between 0.90 and 1.15. If the value of "a" is less than 0.90 or greater than 1.15, Ni or other transitional elements may enter the 3$b$ sites (Li sites) of the layered hexagonal crystal lattice of the lithium compound oxide, thereby causing the discharge capacity of the material to decrease. The value of "a" is preferably between 0.95 and 1.10 and more preferably between 0.99 and 1.10.

The sum of the molar ratios of the metals other than Li (i.e., b+c+d+e) is 1.

Nickel (Ni) serves to form the hexagonal crystallographic skeleton of LiNiO$_2$, which provides a high discharge capacity. The molar ratio of Ni, "b", is the remainder of the sum of the molar ratios of the metals other than Li [i.e., b=1−(c+d+e)]. The value of "b" is greater than 0 and less than 0.99.

Cobalt (Co) and manganese (Mn) are present in order to improve the thermal stability of LiNiO$_2$. The molar ratio of Co, "c", and that of Mn, "d", are both greater than 0 and not greater than 0.5. The value of the sum of (c+d) is greater than 0 and not greater than 0.9. For the purpose of improving thermal stability, it is advantageous to add both Co and Mn. However, if the value of either "c" or "d" exceeds 0.5 or the value of the sum of (c+d) exceeds 0.9, the proportion of the LiNiO$_2$ skeleton which exhibits a high capacity decreases so as to cause an extreme decrease in the discharge capacity. Preferably, the value of "c" is at most 0.4, the value of "d" is at most 0.3, and the value of the sum of (c+d) is at most 0.7.

In order to ensure that the thermal stability is improved sufficiently, it is preferred that Co and Mn be added as follows: c≧0.05, d≧0.01. Most preferably, the value of "c" is between 0.10 and 0.35, the value of "d" is between 0.05 and 0.30, and the value of the sum of (c+d) is between 0.25 and 0.65.

The addition of Co and Mn is not enough to improve the thermal stability of LiNiO$_2$ sufficiently. In accordance with the present invention, the thermal stability of LiNiO$_2$ is significantly improved by further adding one or both of tungsten (W) and molybdenum (Mo). In order to attain this effect, the value of the molar ratio of M (which stands for W and/or Mo), "e", is between 0.01 and 0.1. If the value of "e" is less than 0.01, the thermal stability is not improved sufficiently. If it is greater than 0.1, the discharge capacity is deteriorated. The value of "e" is preferably less than 0.05 and more preferably at least 0.02 and less than 0.05. Thus, W and/or Mo exhibits a significant thermal stability-improving effect when added in a very small amount.

A positive active material comprised of a lithium compound oxide of the above formula (1) according to the present invention can be prepared by any appropriate method. A common method comprises mixing oxides of the individual metal elements or their precursors (i.e., substances capable of forming the desired metal oxides by decomposition or oxidation) at a predetermined ratio as uniformly as possible and calcining the resulting mixture in an oxidizing atmosphere. This method is described below more specifically, but it should be understood that the positive active material according to the present invention can be prepared by a method other than the described one.

Ni, Co, and Mn can be coprecipitated as carbonate salts, for example, to give a compound carbonate salt in which these metal elements are mixed uniformly at their atomic level. Specifically, an aqueous solution containing at least one water-soluble compound of each of these metals (e.g., an aqueous solution containing sulfates of these metals) at a predetermined atomic ratio is mixed with an alkaline solution of ammonium hydrogen carbonate at room temperature or under warming, thereby causing these metals (metal ions) to coprecipitate as carbonate salts and form a compound carbonate of Ni, Co, and Mn. This reaction is preferably carried out by adding to a reactor the aqueous solution of the metal compounds and that of ammonium hydrogen carbonate both in small portions simultaneously or alternatingly in order to facilitate a uniform crystal growth. The resulting compound carbonate may be converted into the corresponding compound oxide by heating at a temperature of 300–900° C. to cause thermal decomposition for decarboxylation. The metal compounds used as starting materials are not limited to sulfates, and other appropriate compounds such as chlorides, nitrates, and acetates, which are soluble in water or in an acid solution, may be used.

The compound carbonate of Ni, Co, and Mn obtained by the above-described method or the compound oxide thereof obtained from the compound carbonate by heating is then uniformly mixed with a Li source and a source or sources of W and/or Mo (e.g., using an appropriate mixing machine), and the mixture is calcined in an oxidizing atmosphere to obtain a lithium compound oxide serving as a positive active material according to the present invention. The calcination is carried out under such conditions that the Li source reacts with the sources of the other constituent metals (which are all transition metals) to form a compound oxide of Li with the transition metals.

As the Li source, a lithium compound is more suitable than lithium metal, which is too active. Useful lithium compounds include lithium hydroxide (anhydrous or monohydrate), lithium carbonate, lithium nitrate, lithium oxide, and the like. The source of each of W and Mo may be either the metal itself or a metal compound such as an oxide, carbide, or chloride. Alternatively, W and/or Mo may be introduced into the above-described compound carbonate by coprecipitation as a carbonate from a soluble compound along with Ni, Mn, and Co.

The metal sources present in the mixture to be calcined have an increased reactivity as their particle diameters decrease. In this respect, the compound carbonate or compound oxide of Ni, Co, and Mn (and optionally W and/or Mo) preferably has an average particle diameter of from 6 to 20 $\mu$m, while the Li source compound and the sources of W and/or Mo (if any is used) preferably have an average particle diameter of from 1 to 20 $\mu$m. Therefore, each source may be pulverized and/or classified (sieved) as required.

The temperature at which the mixture is calcined is determined such that the Li source reacts with the sources of the transition metals to form a compound oxide of Li with the transition metals. A preferable calcination temperature is normally in the range of 600–1100° C., and more preferably in the range of 800–1050° C. The calcination atmosphere is an oxidizing atmosphere and preferably an atmosphere having an oxygen concentration higher than that of air, and even a pure oxygen atmosphere may be used. The calcination is performed until the reaction between Li and the transition metals is completed. The duration of calcination is normally at least a few hours depending on the temperature and atmosphere for calcination.

The positive active material (lithium compound oxide) according to the present invention, which is a product obtained by calcination, has a crystal structure in which the basic crystallographic skeleton is hexagonal, which is characteristic of LiCoO$_2$ and LiNiO$_2$. Thus, the 3$a$ sites of the hexagonal lattices are occupied by Ni and Co, part of which is further replaced by Mn.

The state of W and/or Mo as additive elements by which the present invention is characterized has not been completely elucidated, but in an X-ray diffraction pattern of the active material, one or more diffraction peaks assigned to a compound oxide of Li with Mo or W can be confirmed. Therefore, at least part of W and/or Mo crystallizes out as a compound salt with Li to form different phases from the skeletal hexagonal crystals.

Thus, the lithium compound oxide according to the present invention is characterized in that it produces an X-ray diffraction pattern which includes, in addition to main diffraction peaks assigned to the hexagonal crystal structure of the basic skeleton, one or more diffraction peaks assigned to a compound oxide of Li and W and/or a compound oxide of Li and Mo (the latter peaks being hereinafter referred to as secondary diffraction peaks in some places). With a positive active material which does not produce such a secondary diffraction peak, an improved thermal stability cannot be obtained even if it contains W or Mo.

Although the particular compounds for a compound oxide of Li and W and that of Li and Mo are not limited, they are typically Li$_2$WO$_4$ and Li$_4$MoO$_5$ both having a rhombohedral crystal form. Thus, typically, one or more diffraction peaks assigned to such a rhombohedral crystal appear in an X-ray diffraction pattern of a positive active material according to the present invention.

A positive active material according to the present invention can be used to produce positive electrodes in a conventional manner. A mixture for making positive electrodes (composition for forming positive electrodes) which predominantly comprises the positive active material in powdered form is usually prepared. The mixture usually contains a binder and a conducting additive in addition to the positive active material. A positive electrode can be produced by forming a paste from a mixture containing these constituents with a small amount of a solvent and applying the paste to an electrode substrate serving as a current collector to form a thin layer of the paste, which is then dried, optionally after compacting by rolling or similar technique. Instead of the paste being applied, the paste may be preformed into a sheet, which is then press-bonded to an electrode substrate and dried to produce a positive electrode. Other methods may be employed.

The binder is not critical unless it is attacked by the nonaqueous electrolytic solution of a battery, and it is generally a fluoroplastic. The conducting additive is not always necessary, but it is usually added since the electric conductivity of the positive active material according to the present invention is not considerably high. As a conducting additive, a carbon powder such as acetylene black is generally used. The electrode substrate may be made of a metal such as aluminum or a stainless steel, and it may be either a solid sheet or in a porous form such as a perforated sheet or mesh. The substrate may be a very thin sheet such as a foil.

When a nonaqueous electrolyte secondary battery according to the present invention is assembled using a positive electrode produced from a positive active material according to the present invention, the other elements of the battery such as a negative electrode, electrolytic solution, and separator are not limited to particular forms. A nonaqueous electrolyte secondary battery is represented by a lithium secondary battery, and a positive electrode produced from a positive active material according to the present invention is suitable for use in a lithium secondary battery, although, in principle, it can be used in other nonaqueous electrolyte secondary batteries.

In the case of a lithium secondary battery, a negative electrode for nonaqueous electrolyte secondary batteries is comprised of either lithium metal or a substance capable of reversibly absorbing and desorbing Li or Li ions. Lithium metal can be used to form a negative electrode for an experimental battery, but it is inevitably accompanied by a loss of cycle life due to precipitation of lithium metal in dendrites during charging. Therefore, in a battery for practical use, the negative electrode is normally formed from a substance capable of reversibly absorbing and desorbing Li or Li ions. Examples of such a substance for negative electrodes include carbonaceous materials including pyrolytic carbon, coke (pitch coke, needle coke, petroleum coke, etc.), graphite, vitreous carbon, fired organic polymers (obtained by firing a phenolic, furane, or similar resin at an appropriate temperature so as to carbonize it), carbon fibers, and activated carbon; lithium alloys (e.g., Li—Al alloys); and polymers such as polyacenes and polypyrrols.

An electrolytic solution for a lithium secondary battery is usually a nonaqueous solution of a lithium salt as an electrolyte dissolved in an organic solvent at a concentration of about 0.5–1.5 M.

Examples of suitable electrolytes include lithium perchlorate, lithium trifluoromethane-sulfonate, lithium tetrafluoroborate, lithium hexafluorophosphate, lithium hexafluoroarsenate, and the like.

The organic solvent used to dissolve the electrolyte includes, for example, propylene carbonate, ethylene carbonate, butylene carbonate, γ-butyrolactone, dimethyl carbonate, ethyl methyl carbonate, acetate compounds, propionate compounds, diacetate compounds, dimethoxyethane, diethoxyethane, dimethoxypropane, diethoxypropane, tetrahydrofuran, dioxolanes, and the like, which may be used singly or as a mixed solvent of two or more of these solvents.

In the future, it will be possible to use a polymeric electrolyte which is now under development including a polymer complex type electrolyte having Li ions coordinated to oxygen atoms of a polymer to form a complex or a gel type electrolyte.

The shape and operating potential grade of the nonaqueous electrolyte secondary battery are not critical. The battery may be of any shape, so it may be a coin-shaped battery, cylindrical spiral-type battery, flat rectangular battery, inside-out cylindrical battery, polymer battery, or the like. With respect to the operating potential grade, it is possible to constitute a battery of up to max. 5V grade depending on the combination with the material for the negative electrode.

Using a positive active material according to the present invention, it is made possible to manufacture nonaqueous electrolyte secondary batteries having a higher capacity and a comparable or higher thermal stability with lower costs, compared to current lithium ion secondary batteries using $LiCoO_2$ as a positive active material.

Furthermore, the nonaqueous electrolyte secondary batteries according to the present invention can also be used suitably as large-sized batteries for automobiles or of the stationary type, since they can provide a high voltage with a high energy density and have a good cycle life at high temperatures.

EXAMPLES

The present invention will be illustrated by the following examples, which are presented merely for illustrative purpose and are not intended to be restrictive in any way.

Example 1

Preparation of Compound Oxide

An aqueous solution A was prepared by dissolving nickel sulfate, manganese sulfate, and cobalt sulfate in purified water in such a proportion that the molar ratio of Ni:Mn:Co was 0.56:0.30:0.14. Separately, an aqueous solution B was prepared by adding a concentrated aqueous ammonia to an aqueous solution of ammonium hydrogen carbonate in an amount sufficient to make the solution alkaline. To an agitated tank containing an appropriate amount of water, the aqueous solutions A and B were alternatingly added in small portions at a given flow rate using metering pumps. After the addition was finished, the precipitates which were formed were collected by filtration, washed with water, and dried at 60° C. for one day to give a Ni—Mn—Co compound carbonate.

The compound carbonate was thermally decomposed by heating at around 550° C. in air to give a Ni—Mn—Co compound oxide. The resulting compound oxide had an average particle diameter of about 10 μm and was directly used in the preparation of a positive active material without pulverization and classification.

Preparation of Positive Active Material

To 28.34 kg of the compound oxide, 9.16 kg of lithium hydroxide (anhydrous) and 2.5 kg of tungsten trioxide were added and uniformly mixed. The lithium hydroxide used was a fine powder obtained by pulverization in an oscillating ball mill followed by classification to collect particles of 20 μm or smaller. The tungsten trioxide was also a fine powder of 1 to 20 μm. The resulting powder mixture was placed in an aluminum vessel having a purity of 99.8% and calcined for 10 hours at a temperature of 920–950° C. in a pure oxygen atmosphere to give 36.67 kg of a lithium compound oxide as a positive active material.

The composition of the resulting lithium compound oxide was analyzed by ICP emission spectrometry and atomic absorption spectrometry and determined to contain 7.1% Li, 30.8% Ni, 16.0% Mn, 8.3% Co, and 4.6% W in mass % and have a molar ratio of Li/(Ni+Mn+Co+W) of 1.04. The lithium compound oxide had the composition shown in Table 1.

Figure 1:
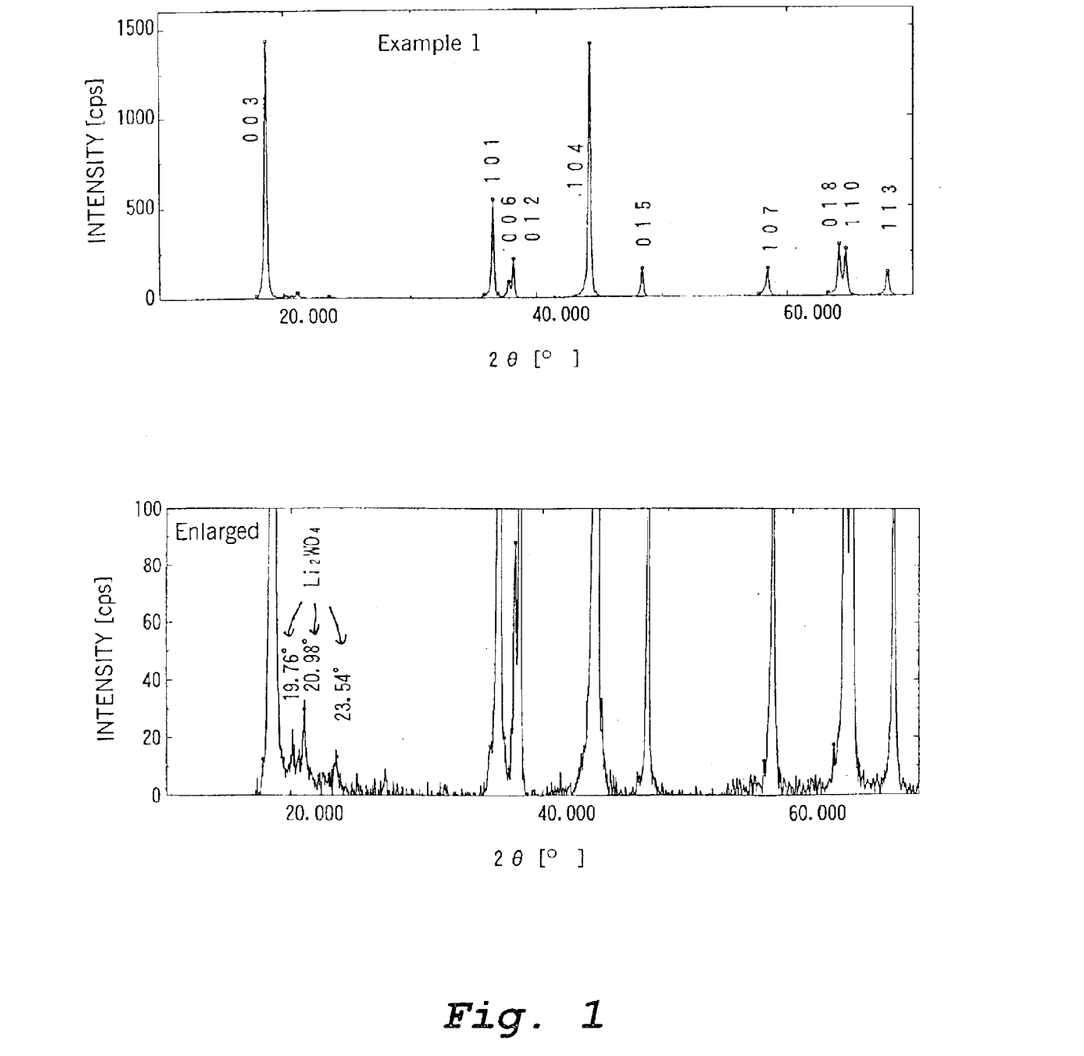
FIG. 1 shows an X-ray diffraction pattern of a lithium compound oxide obtained in Example 1 as a positive active material according to the present invention (in the upper half) and a partial enlarged view of the upper chart (in the lower half)

FIG. 1 shows an X-ray diffraction pattern of the lithium compound oxide using Cu Kα rays. As can be confirmed from FIG. 1, the X-ray diffraction pattern includes, in addition to main diffraction peaks capable of being indexed under space group R3-m (hexagonal system) (peaks assigned to $LiNiO_2$ or $LiCoO_2$), secondary diffraction peaks at 19.76°, 20.98°, and 23.54° assigned to $Li_2WO_4$ of space group R-3 (rhombohedral system).

Testing Methods of Positive Active Material (1) Battery Test

The lithium compound oxide (positive active material) prepared above, acetylene black (conducting additive), and a polytetrafluoroethylene resin (binder) were placed in a mortar at a mass ratio of active material:conducting additive:binder of 67:22:11 and mixed for 15 minutes therein. The mixture was molded into a disc having a thickness of 0.2 mm and a diameter of 18 mm, which was press-bonded to a stainless mesh having a diameter of 18 mm and dried at 200° C. to provide a positive electrode to be tested.

Figure 8:
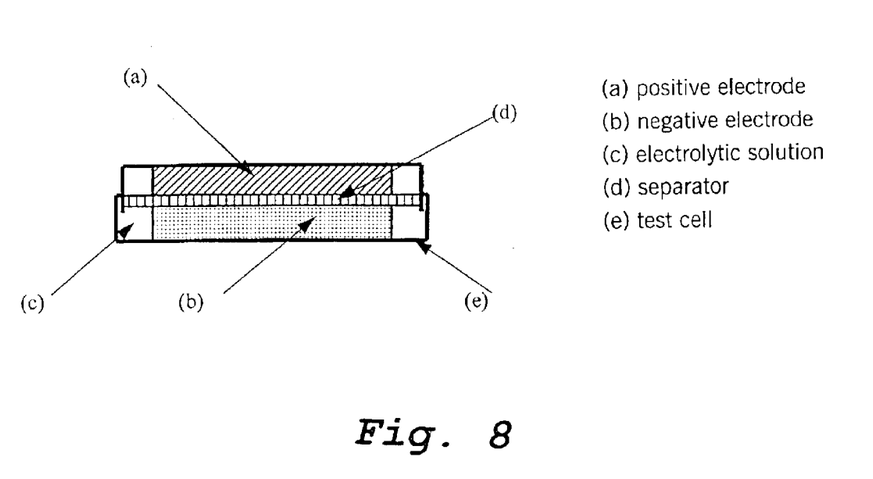
FIG. 8 is a schematic illustration showing the structure of a coin-shaped battery assembled in the examples for a battery test.

The positive electrode prepared above, a polypropylene separator (sold under the tradename Cellguard), and a lithium metal foil measuring 0.2 mm in thickness (negative electrode) were stacked in a test cell as shown in FIG. 8. As an electrolytic solution, a 1M solution of lithium hexafluorophosphate ($LiPF_6$) in a mixed solvent of ethylene carbonate (EC) and dimethoxy carbonate (DMC) at a volume ratio of 1:2 was used and poured into the test cell.

A repeated charge-discharge test was performed using a coin-shaped test battery having the above described structure. The charge and discharge were carried out under voltage regulations by charging to 4.3 V and discharging to 3.0 V with a constant current of 0.707 mA (0.4 $mA/cm^2$). The discharge capacity obtained after the first charging under the above-described voltage regulations was recorded as an initial capacity. The charge and discharge were repeated for 50 cycles under the above-described conditions, and the discharge capacity obtained in the 50th cycle was also measured. The percent retention of the 50th cycle discharge capacity relative to the initial capacity was calculated to evaluate the cycle life of the test battery. The test results are also given in Table 1.

(2) DSC Measurement (Thermal Stability in Charged State)

A coin-shaped battery was assembled in the same manner as described for (1) above. After being charged to 4.3 V, the battery was disassembled. The disc of the positive active material in a charged state was recovered from the positive electrode and thoroughly washed with dimethoxy carbonate (DMC). A 2 mg aliquot of the positive active material was placed into a stainless steel pressure pan for DSC measurement along with about 2 μL of the same electrolytic solution as above [1M $LiPF_6$ in (EC+DMC, 1:2)] and DSC measurement was carried out while the temperature was increased from 25° C. to 500° C. at a rate of 10° C./min. The results are shown in Table 1 and FIG. 7.

Example 2

To 29.04 kg of a Ni—Mn—Co compound oxide (Ni:Mn:Co=0.56:0.30:0.14) prepared in the same manner as described in Example 1, 9.39 kg of lithium hydroxide (anhydrous) and 1.57 kg of molybdenum trioxide were added and uniformly mixed. The lithium hydroxide was the same fine powder of 20 μm or smaller as used in Example 1, and the molybdenum trioxide was also a fine powder of 1 to 20 μm. The resulting powder mixture was placed into an aluminum vessel having a purity of 99.8% and calcined in the same manner as described in Example 1 to give 36.92 kg of a lithium compound oxide as a positive active material.

Analysis of the composition of the resulting lithium compound oxide showed that it contained 7.2% Li, 30.9% Ni, 16.1% Mn, 8.3% Co, and 2.8% Mo in mass % and had a molar ratio of Li/(Ni+Mn+Co+Mo) of 1.05. The lithium compound oxide had the composition shown in Table 1.

Figure 2:
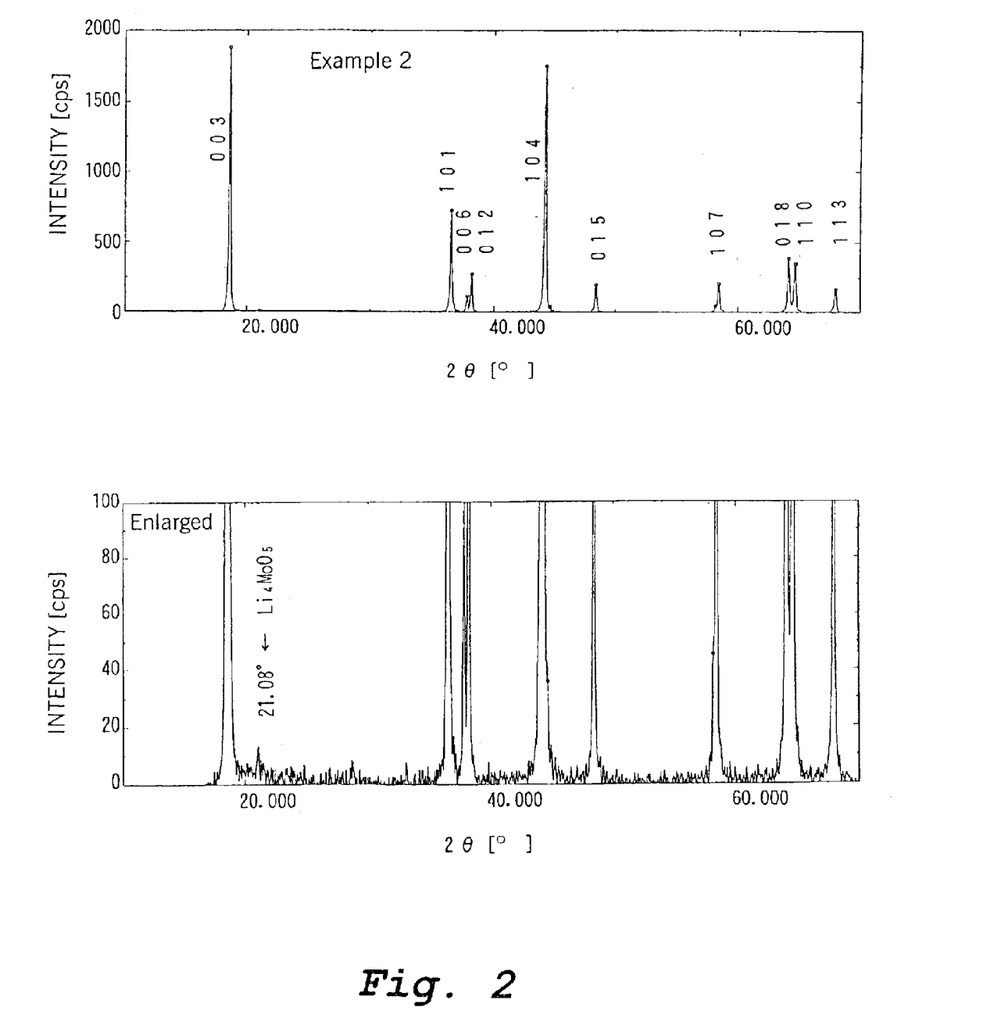
FIG. 2 shows an X-ray diffraction pattern of a lithium compound oxide obtained in Example 2 as a positive active material according to the present invention (in the upper half) and a partial enlarged view of the upper chart (in the lower half)

An X-ray diffraction pattern of the lithium compound oxide using Cu Kα rays is shown in FIG. 2. It can be seen that the X-ray diffraction pattern includes, in addition to main diffraction peaks capable of being indexed under space group R3-m, a secondary diffraction peak at 21.08° assigned to $Li_4MoO_5$ of the rhombohedral system.

Figure 7:
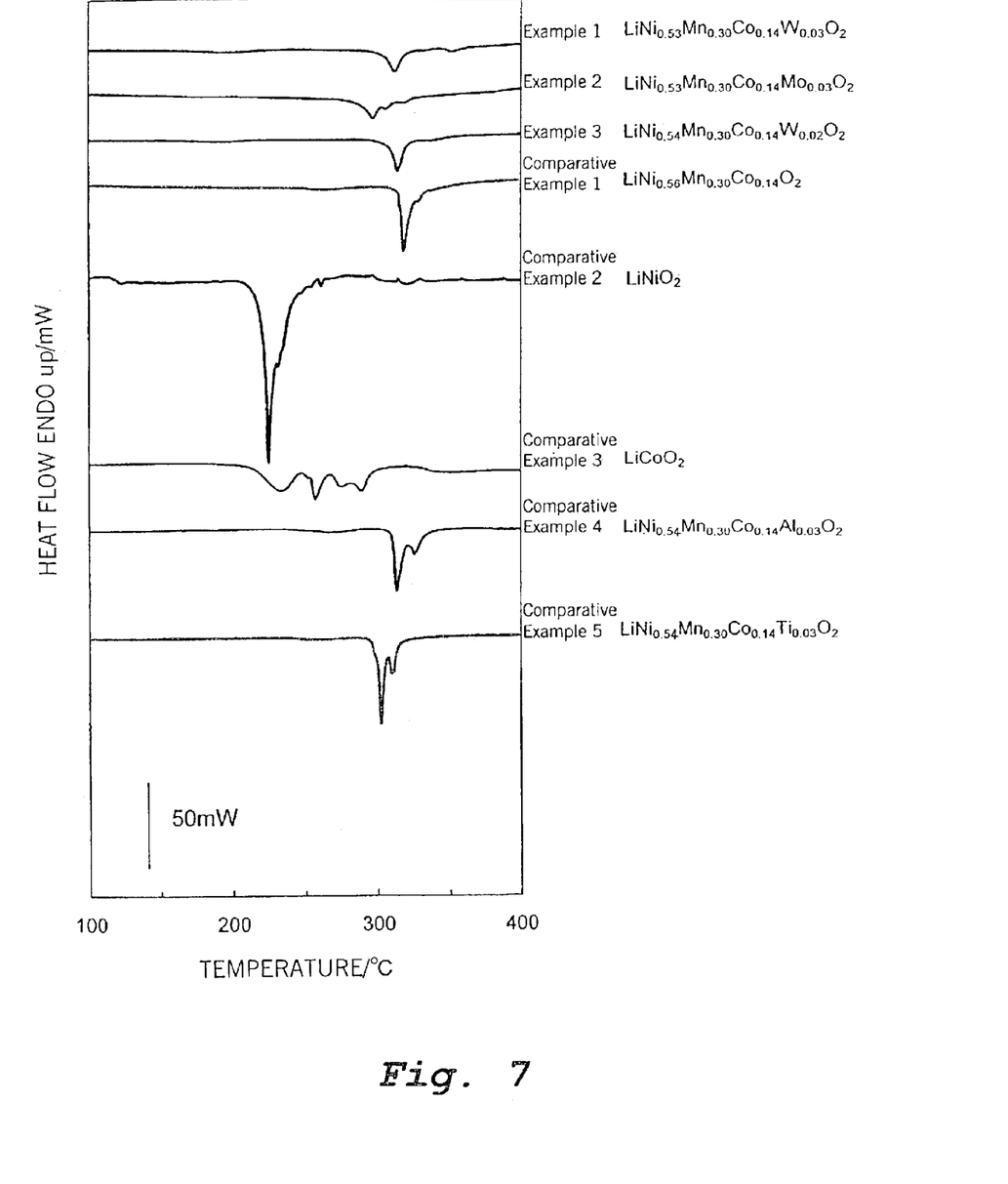
FIG. 7 shows DSC diagrams of compound oxides in a charged state which were obtained in Examples 1 to 3 and Comparative Examples 1 to 5 as positive active materials.

The results of measurements with a test battery prepared in the same manner as described in Example 1 and the results of DSC measurements are shown in Table 1 and FIG. 7.

Example 3

In the same manner as described in Example 1 except that 9.29 kg of lithium hydroxide (anhydrous) and 1.71 kg of tungsten trioxide were added to 29.01 kg of a Ni—Mn—Co compound oxide (Ni:Mn:Co=0.56:0.30:0.14),36.56 kg of a lithium compound oxide were obtained.

Analysis of the composition of the resulting lithium compound oxide showed that it contained 7.3% Li, 31.1% Ni, 16.0% Mn, 8.4% Co, and 3.8% W and had a molar ratio of Li/(Ni+Mn+Co+W) of 1.07.

Figure 3:
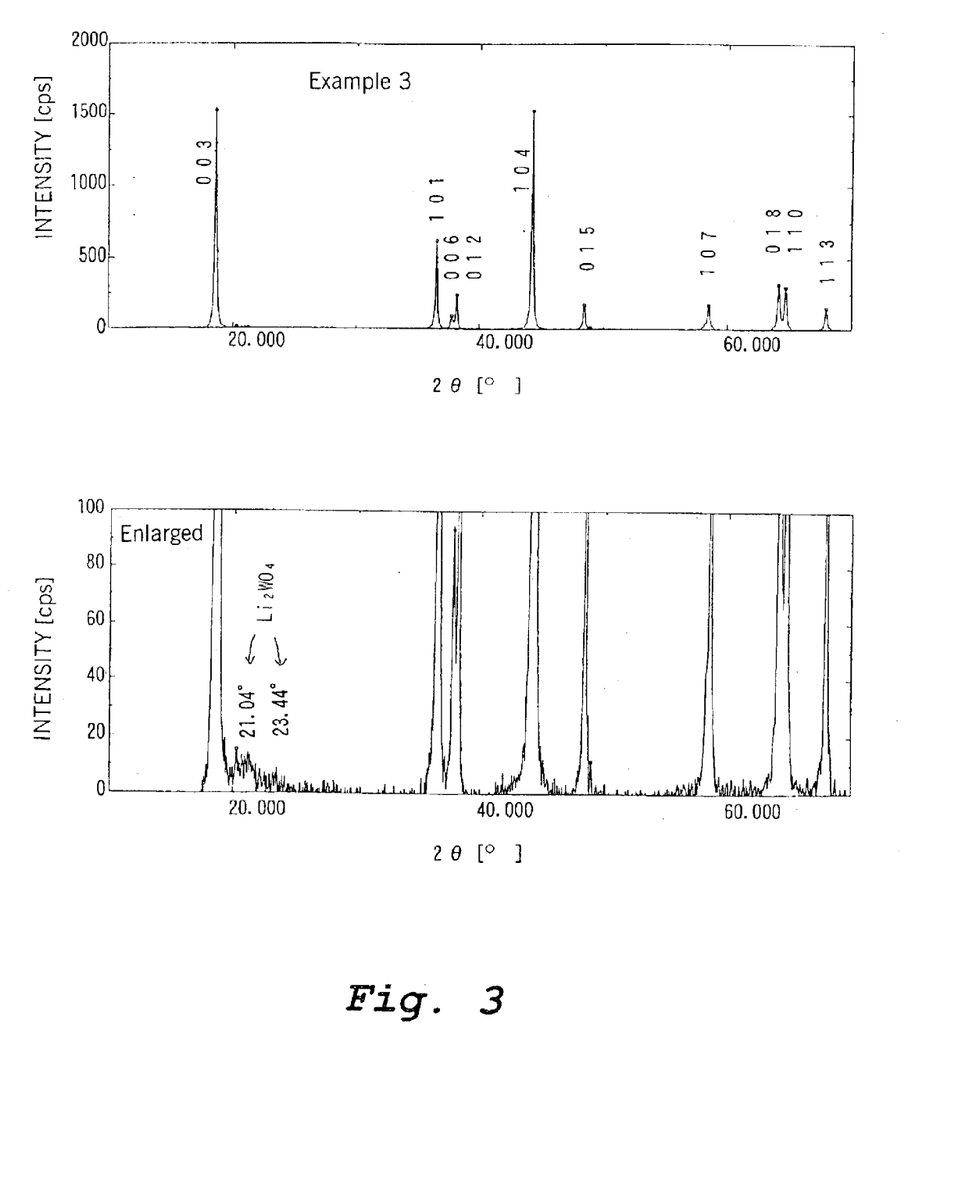
FIG. 3 shows an X-ray diffraction pattern of a lithium compound oxide obtained in Example 3 as a positive active material according to the present invention (in the upper half) and a partial enlarged view of the upper chart (in the lower half)

An X-ray diffraction pattern of the lithium compound oxide using Cu Kα rays is shown in FIG. 3. It can be seen that the X-ray diffraction pattern includes, in addition to main diffraction peaks capable of being indexed under space group R3-m, secondary diffraction peaks at 21.04° and 23.44° assigned to $Li_2WO_4$ of the rhombohedral system.

The results of measurements with a test battery prepared in the same manner as described in Example 1 and the results of DSC measurements are shown in Table 1 and FIG. 7.

Comparative Example 1

A mixture obtained by adding 9.56 kg of lithium hydroxide (anhydrous) to 30.44 kg of a Ni—Mn—Co compound oxide (Ni:Mn:Co=0.56:0.30:0.14) followed by mixing uniformly was calcined at a temperature of 900° C. in the same manner as described in Example 1 to give 36.92 kg of a lithium compound oxide.

Analysis of the composition of the resulting lithium compound oxide showed that it contained 7.4% Li, 32.8% Ni, 16.2% Mn, and 8.5% Co in mass % and had a molar ratio of Li/(Ni+Mn+Co) of 1.07.

Figure 4:
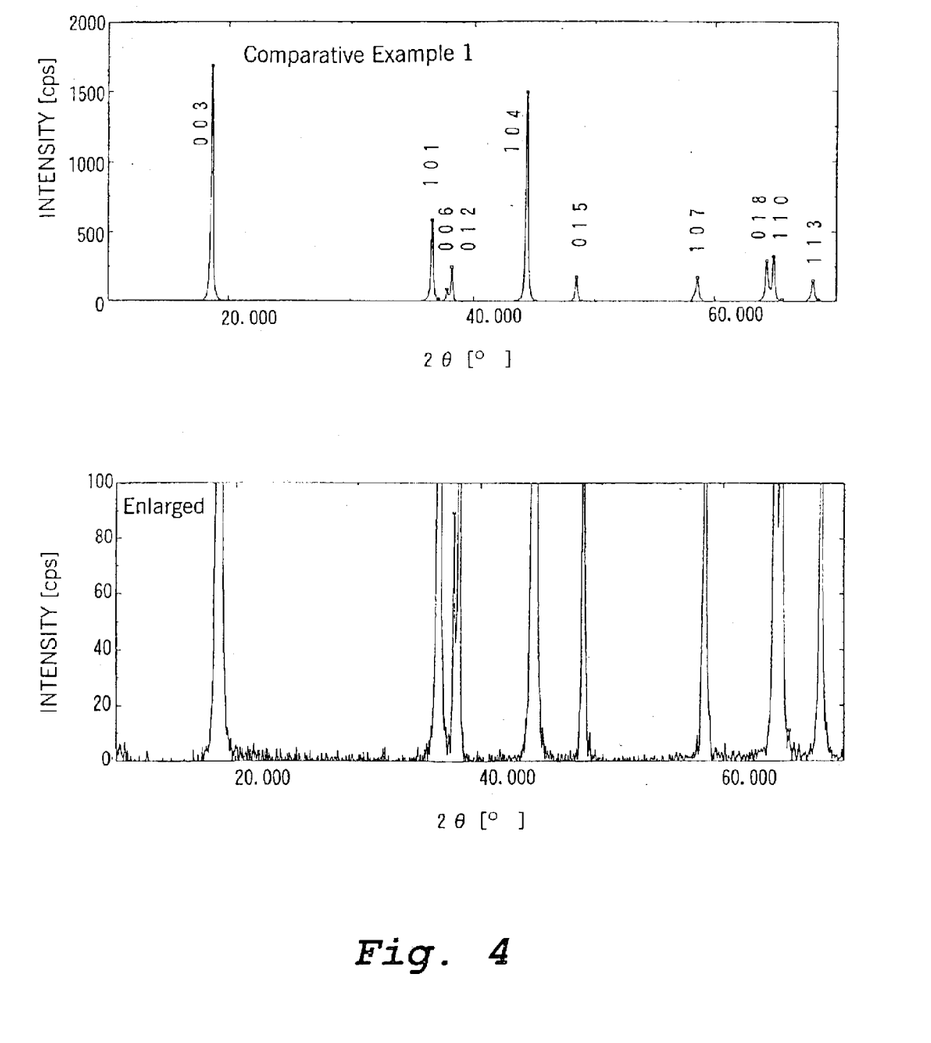
FIG. 4 shows an X-ray diffraction pattern of a lithium compound oxide obtained in Comparative Example 1 as a positive active material (in the upper half) and a partial enlarged view of the upper chart (in the lower half)

An X-ray diffraction pattern of the lithium compound oxide using Cu Kα rays is shown in FIG. 4. It can be seen that the X-ray diffraction pattern includes only main diffraction peaks capable of being indexed under space group R3-m.

The results of measurements with a test battery prepared in the same manner as described in Example 1 and the results of DSC measurements are shown in Table 1 and FIG. 7.

Comparative Example 2

A mixture obtained by uniformly mixing 32.65 kg of commercially available nickel hydroxide and 7.35 kg of lithium hydroxide (anhydrous) was calcined at a temperature of 700° C. in the same manner as described in Example 1 to give 31.92 kg of lithium nickelate.

Analysis of the composition of the resulting lithium nickelate showed that it contained 6.8% Li, 59.4% Ni, and 0.7% Co in mass % and had a molar ratio of Li/(Ni+Co) of 0.96.

Figure 5:
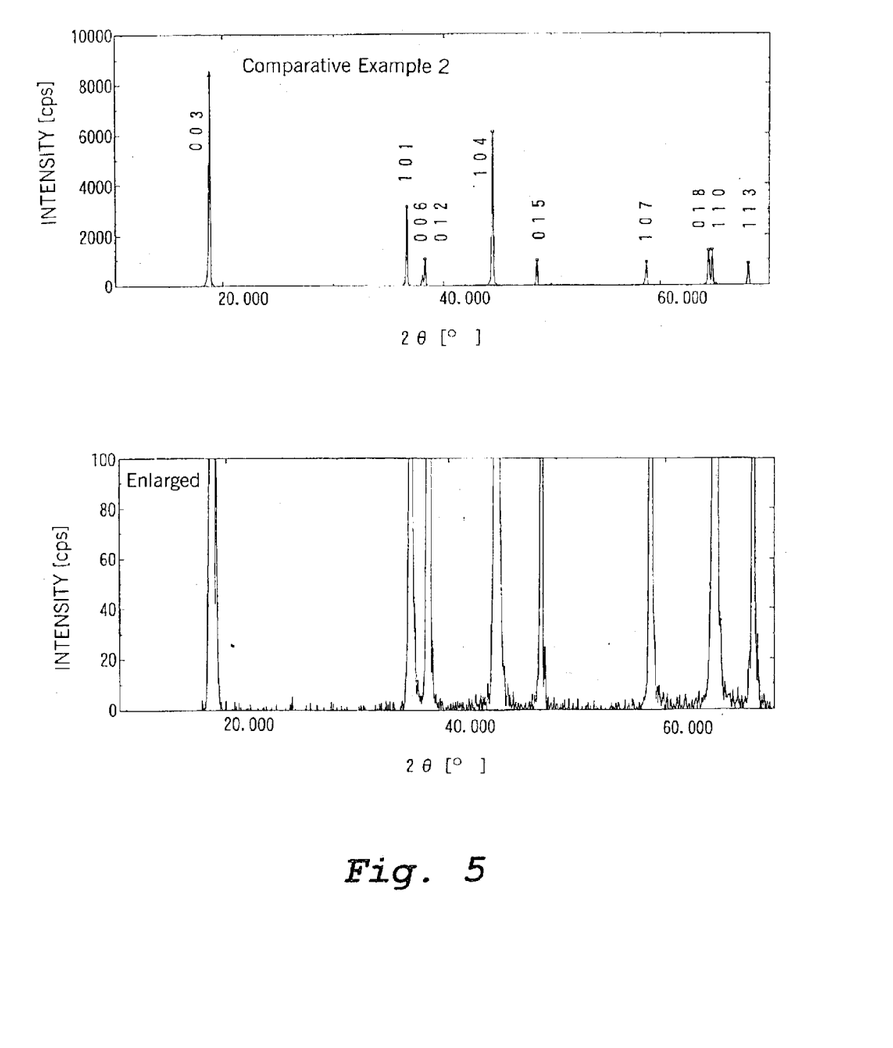
FIG. 5 shows an X-ray diffraction pattern of a lithium nickelate obtained in Comparative Example 2 as a positive active material (in the upper half) and a partial enlarged view of the upper chart (in the lower half)

An X-ray diffraction pattern of the product using Cu Kα rays is shown in FIG. 5. It can be seen that the X-ray diffraction pattern includes only main diffraction peaks capable of being indexed under space group R3-m.

The results of measurements with a test battery prepared in the same manner as described in Example 1 and the results of DSC measurements are shown in Table 1 and FIG. 7.

Comparative Example 3

A mixture obtained by uniformly mixing 31.66 kg of commercially available cobalt tetraoxide and 8.34 kg of lithium hydroxide (anhydrous) was calcined at a temperature of 900° C. in the same manner as described in Example 1 to give 36.08 kg of lithium cobaltate.

Analysis of the composition of the resulting lithium cobaltate showed that it contained 7.0% Li and 59.7% Co in mass % and had a molar ratio of Li/Co of 1.00.

Figure 6:
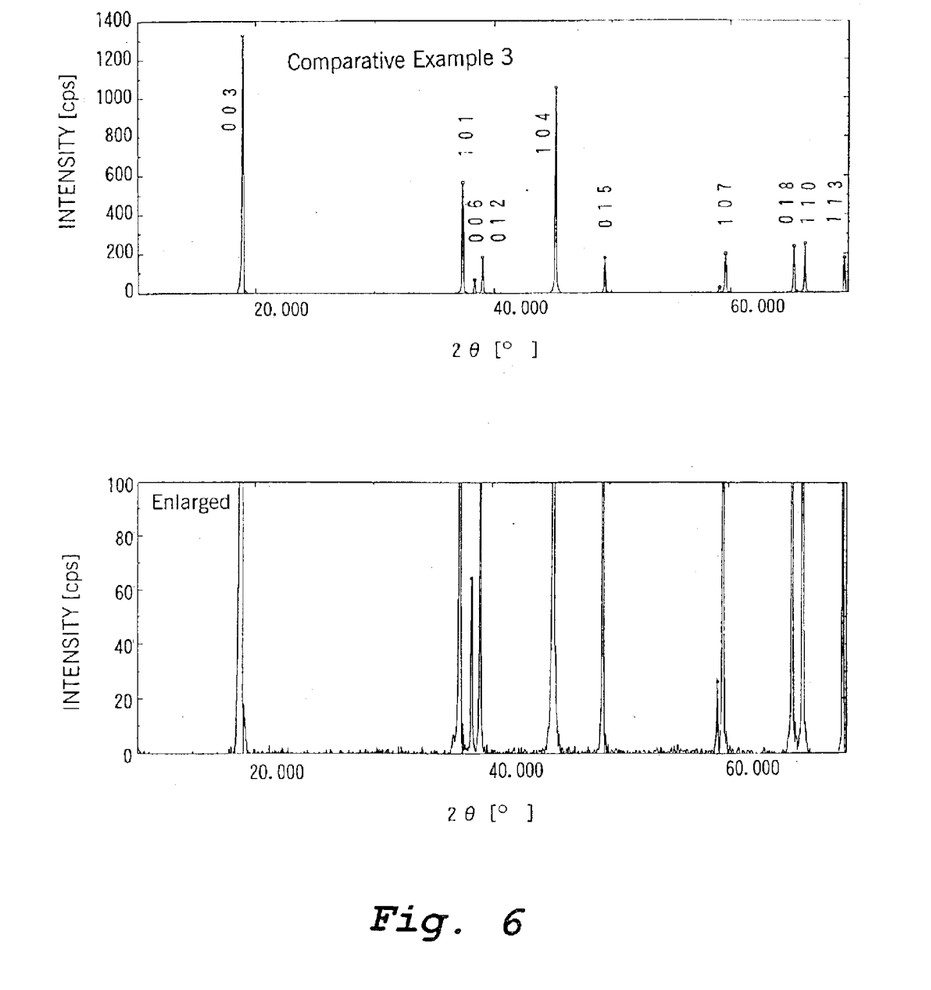
FIG. 6 shows an X-ray diffraction pattern of a lithium cobaltate obtained in Comparative Example 3 as a positive active material (in the upper half) and a partial enlarged view of the upper chart (in the lower half)

An X-ray diffraction pattern of the product using Cu Kα rays is shown in FIG. 6. It can be seen that the X-ray diffraction pattern includes only main diffraction peaks capable of being indexed under space group R3-m.

The results of measurements with a test battery prepared in the same manner as described in Example 1 and the results of DSC measurements are shown in Table 1 and FIG. 7.

Comparative Example 4

In exactly the same manner as described in Example 1 except that 9.56 kg of lithium hydroxide (anhydrous) and 0.88 kg of aluminum hydroxide were added to 29.57 kg of a Ni—Mn—Co compound oxide (Ni:Mn:Co= 0.56:0.30:0.14), 37.12 kg of a lithium compound oxide were obtained.

The lithium compound oxide had a compositional formula and a composition as shown in Table 1. The results of measurements with a test battery prepared in the same manner as described in Example 1 and the results of DSC measurements are shown in Table 1 and FIG. 7.

Comparative Example 5

In exactly the same manner as described in Example 1 except that 9.54 kg of lithium hydroxide (anhydrous) and 0.93 kg of titanium oxide were added to 29.52 kg of a Ni—Mn—Co compound oxide (Ni:Mn:Co=0.56:0.30:0.14), 36.58 kg of a lithium compound oxide were obtained.

The lithium compound oxide had a compositional formula and a composition as shown in Table 1. The results of measurements with a test battery prepared in the same manner as described in Example 1 and the results of DSC measurements are shown in Table 1 and FIG. 7.

Comparative Example 6

To 29.84 kg of a commercially available nickel hydroxide, 8.01 kg of lithium hydroxide (anhydrous) and 2.15 kg of tungsten trioxide were added and uniformly mixed. The lithium hydroxide was the same fine powder of 20 μm or smaller as used in Example 1, and the tungsten trioxide was also a fine powder of 1 to 20 μm. The resulting powder mixture was placed in an aluminum vessel having a purity of 99.8% and calcined for more than several hours at a temperature of 950–750° C. in a pure oxygen atmosphere to give 32.82 kg of a lithium compound oxide.

The lithium compound oxide had a compositional formula and a composition as shown in Table 1. The results of measurements with a test battery prepared in the same manner as described in Example 1 and the results of DSC measurements are shown in Table 1 and FIG. 7.

TABLE 1

| No. | Compositional Formula | Metal Contents (mass %) | | | | | Battery Test | | DSC Results | |
|---|---|---|---|---|---|---|---|---|---|---|
| | | Li | Ni | Mn | Co | Other Metal | Initial Capacity (mAh/g) | Cycle Life (%) | Exotherm Peak Temp. | Calorific Value (J/g) |
| Example | | | | | | | | | | |
| 1 | $Li_{1.04}Ni_{0.53}Mn_{0.30}Co_{0.14}W_{0.03}O_2$ | 7.1 | 30.8 | 16.0 | 8.3 | W: 4.6 | 157 | 95 | 312° C. | 295 |
| 2 | $Li_{1.05}Ni_{0.53}Mn_{0.30}Co_{0.14}Mo_{0.03}O_2$ | 7.2 | 30.9 | 16.1 | 8.3 | Mo: 2.8 | 156 | 94 | 296° C. | 366 |
| 3 | $Li_{1.07}Ni_{0.54}Mn_{0.30}Co_{0.14}W_{0.02}O_2$ | 7.3 | 31.1 | 16.0 | 8.4 | W: 3.8 | 161 | 94 | 311° C. | 363 |
| Comparative Example | | | | | | | | | | |
| 1 | $Li_{1.07}Ni_{0.56}Mn_{0.30}Co_{0.14}O_2$ | 7.4 | 32.8 | 16.2 | 8.5 | — | 165 | 89 | 314° C. | 619 |
| 2 | $Li_{0.96}Ni_{0.99}Co_{0.01}O_2$ | 6.8 | 59.4 | 0.0 | 0.7 | — | 180 | 80 | 220° C. | 1236 |
| 3 | $Li_{1.00}Co_{1.00}O_2$ | 7.0 | 0.0 | 0.0 | 59.7 | — | 150 | 95 | 250° C. | 517 |
| 4 | $Li_{1.05}Ni_{0.54}Mn_{0.30}Co_{0.14}Al_{0.03}O_2$ | 7.4 | 32.0 | 16.6 | 8.4 | Al: 0.8 | 154 | 89 | 312° C. | 643 |
| 5 | $Li_{1.05}Ni_{0.54}Mn_{0.30}Co_{0.14}Ti_{0.03}O_2$ | 7.4 | 31.8 | 16.6 | 8.4 | Ti: 1.4 | 157 | 92 | 302° C. | 656 |
| 6 | $Li_{1.08}Ni_{0.97}W_{0.03}O_2$ | 7.0 | 55.0 | — | — | W: 5.1 | 137 | 89 | 216° C. | 704 |

As can be seen from the results of the battery test shown in Table 1, the initial capacity of lithium nickelate of Comparative Example 2 was considerably higher than that of lithium cobaltate of Comparative Example 3, which is used as a positive active material in current practical lithium ion secondary batteries. However, lithium nickelate had a low DSC exotherm peak temperature of 220° C. with a very large calorific value of 1236 J/g in a charged state. Thus, the thermal stability of lithium nickelate in a charged state was significantly lower than that of lithium cobaltate.

In contrast, the lithium compound oxide of Comparative Example 1 in which Mn and Co were added to lithium nickelate maintained an initial capacity higher than that of lithium cobaltate and had a DSC exotherm peak temperature shifted to a higher temperature than that of lithium nickelate with an approximately halved calorific value. Thus, the lithium compound oxide of Comparative Example 1 was improved to some extent with respect to thermal stability in a charged state. However, its calorific value was still larger than that of lithium cobaltate of Comparative Example 3, so the improvement in thermal stability was insufficient.

The lithium compound oxides of Examples 1 to 3, in which a very small amount of W or Mo at a molar ratio of 0.02 to 0.03 in their compositional formula was added to the Mn, Cu-containing lithium nickelate of Comparative Example 1 according to the present invention, had DSC calorific values in a charged state which were reduced to approximately half (48–59%) the value in Comparative Example 1. Nevertheless, these oxides had initial capacities which were still maintained at substantially the same level as the material of Comparative Example 1, i.e., which were higher than that of lithium cobaltate of Comparative Example 3. The DSC exotherm peak temperatures of these oxides were nearly the same as that of Comparative Example 1. Therefore, the addition of a very small amount of W and/or Mo according to the present invention has the surprising thermal stabilization effect that it is possible to approximately halve the calorific value without significantly varying the initial capacity or shifting the exotherm peak temperature.

In accordance with the present invention, it is made possible to provide high-performance positive active materials which are improved in both capacity and thermal stability in a charged state with lower costs due to a lower Co content, compared to lithium cobaltate (Comparative Example 3) which is the current practical positive active material. Specifically, they have a higher initial capacity, a DSC exotherm peak temperature increased by more than about 50° C., and a calorific value suppressed to about 57–71% compared to lithium cobaltate. Compared to lithium nickelate (Comparative Example 2), the calorific values of the positive active materials according to the present invention in a charged state are significantly reduced to 24–30% the value of lithium nickelate.

The exothermic heat appears to be concerned with a reaction between the electrolytic solution and oxygen, which is generated from the positive active material in a charged state by decomposition occurring at a high temperature. With a positive active material according to the present invention, it is presumed that the decomposition temperature shifts to a higher temperature and that the amount of oxygen generated by the decomposition is significantly small.

With respect to cycle life, the positive active materials of Examples 1 to 3 according to the present invention had an excellent cycle life comparable to that of lithium cobaltate of Comparative Example 3 which is now in practical use. Since the cycle life of these active materials was improved over the material of Comparative Example 1 which did not contain W and Mo, it can be concluded that the addition of W or Mo is effective for improving not only thermal stability but also cycle life. The positive active material of lithium nickelate of Comparative Example 2 had a poor cycle life.

As shown in FIGS. 1 to 3, the lithium compound oxides obtained in Examples 1 to 3 gave X-ray diffraction patterns including one or more peaks assigned to the rhombohedral system of a compound oxide of Li with the added W or Mo ($Li_2WO_4$, $Li_4MoO_5$). Thus, it can be concluded that at least part of the added W or Mo is present as a compound oxide with Li and forms a different phase from the hexagonal phase. Although the mechanism is not clear, the phase of the compound oxide of Li with W or Mo seems to contribute to the improved thermal stability of a positive active material according to the present invention.

With the lithium compound oxides of Comparative Examples 4 and 5 in which Al or Ti was added, in place of W or Mo, at the same molar ratio of 0.03 as the Examples, the DSC calorific values in a charged state were approximately at the same level as or slightly inferior to (larger than) the value in Comparative Example 1 containing no additive element. Thus, the effect on improving thermal stability in a charged state achieved by addition of a small amount of an element to the composition of Comparative Example 1 in accordance with the present invention is inherently applicable when the added element is W or Mo and it cannot be obtained when another element is added.

The material of Comparative Example 6 in which a small amount of W was added to lithium nickelate was not satisfactory in both battery properties and thermal stability. Thus, it is entirely impossible to achieve the object of the present invention by addition of W alone to pure lithium nickelate which is not in a compound oxide.

Industrial Applicability

The present invention provides a high-performance positive active material which has a higher initial capacity and higher thermal stability in a charged state compared to $LiCoO_2$ (lithium cobaltate) used as a positive active material in current practical lithium ion secondary batteries. The positive active material according to the present invention can be prepared less expensively than the current positive active material. Therefore, the positive active material is useful in various nonaqueous electrolyte secondary batteries including lithium ion secondary batteries, thereby contributing to improvement in performance and reduction in costs of nonaqueous electrolyte secondary batteries and to development of electric cars equipped with large-sized nonaqueous electrolyte secondary batteries.

It should be understood by those skilled in the art that the present invention is not restricted to the specific embodiments described above and various modifications of the embodiments described above can be made without departing from the scope of the present invention.

What is claimed is:

1. A positive active material for nonaqueous electrolyte secondary batteries, characterized in that it is comprised of a lithium compound oxide of the formula:

$$Li_aNi_bCo_cMn_dM_eO_2 \quad (1)$$

where M stands for one or two of W and Mo, $0 < c+d \leq 0.9$, $0.01 \leq e \leq 0.1$, and $b+c+d+e=1$, and in that the lithium compound oxide gives an X-ray diffraction pattern including a diffraction peak or peaks assigned to a compound oxide of Li and W and/or a compound oxide of Li and Mo, in addition to main diffraction peaks assigned to a hexagonal crystal structure.

2. The positive active material for nonaqueous electrolyte secondary batteries according to claim 1, wherein "a" is $0.95 \leq a \leq 1.10$.

3. The positive active material for nonaqueous electrolyte secondary batteries according to claim 1, wherein "c" is $0.05 \leq c \leq 0.4$.

4. The positive active material for nonaqueous electrolyte secondary batteries according to claim 1, wherein "d" is $0.01 \leq d \leq 0.3$.

5. The positive active material for nonaqueous electrolyte secondary batteries according to claim 1, wherein "c" and "d" are $0<c+d \leq 0.7$.

6. The positive active material for nonaqueous electrolyte secondary batteries according to claim 1, wherein "e" is $0.01 \leq e<0.5$.

7. The positive active material for nonaqueous electrolyte secondary batteries according to claim 1, wherein the diffraction peak or peaks assigned to a compound oxide of Li and W and/or a compound oxide of Li and Mo is a peak or peaks assigned to rhombohedral $Li_2WO_4$ and/or $Li_4MoO_5$.

8. A positive electrode mixture for nonaqueous electrolyte secondary batteries predominantly comprising a positive active material according to claim 1.

9. The positive electrode mixture for nonaqueous electrolyte secondary batteries according to claim 8 which further contains a binder and a conducting additive.

10. A nonaqueous electrolyte secondary battery comprising a negative electrode comprised of lithium metal or a substance capable of reversibly absorbing and desorbing Li or Li ions and a positive electrode comprised of a mixture according to claim 8.

* * * * *